Feb. 18, 1947.   F. B. LITTON   2,416,107
SPARK PLUG
Filed March 28, 1945
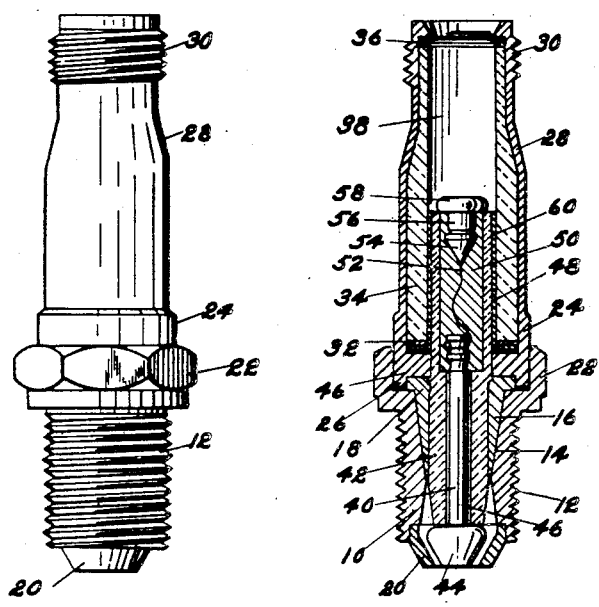
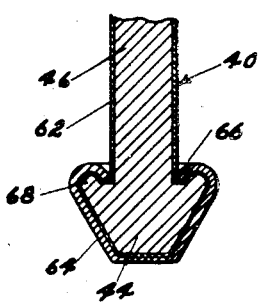
INVENTOR.
FELIX B. LITTON
BY
ATTORNEY Patented Feb. 18, 1947

2,416,107

UNITED STATES PATENT OFFICE 2,416,107

SPARK PLUG

Felix B. Litton, Detroit, Mich., assignor to Bendix Aviation Corporation, Detroit, Mich., a corporation of Delaware Application March 28, 1945, Serial No. 585,228

10 Claims. (Cl. 123—169)

1

This invention relates to spark plugs, and more particularly to the central electrodes of spark plugs.

An object of the invention is to provide a central electrode for spark plugs which has a substantially longer period of life than those presently used.

Another object of the invention is to provide a spark plug central electrode having a head portion which has excellent erosion resistant properties.

A further object of the invention is to enable the usage of a cheaper and more easily machined metal for the central electrode of a spark plug, thus effecting a saving in both material cost and manufacturing time.

And yet another object of the invention is to protect the vulnerable head portion of a spark plug central electrode made from a relatively cheap free-machining steel with a thin layer of highly erosion resistant metal.

The general practice in the production of central electrodes involves the machining of a fairly good erosion-resistant metal alloy, such as Nichrome V, to form the electrode. The material cost and the machining cost, however, are both disproportionately high in view of the average electrode life period obtained, which is somewhat less than that desired due to high temperature erosion of the electrode head portion.

The applicant increases the life period of the electrode head portion by protecting the head with a sheath of noble metal having excellent erosion-resistant properties.

In place of the high-nickel content alloy commonly used for electrodes, the applicant uses a cold-rolled, free machining steel which is less expensive than nickel alloy and admits to an easier and quicker machining operation.

Following the machining operation, the low-carbon steel electrode is electro-plated with a very thin coating of copper. This coating serves two purposes. The primary purpose of the copper is to serve as a brazing material for the thin platinum cup which is placed over the head portion of the electrode following the plating operation. The copper serves the secondary purpose of providing a coating for the electrode spindle which has excellent thermal and electrical conductivity properties. Also, copper protects the steel spindle from corrosion prior to brazing the cup over the head.

After the electro-plating of the electrode, as above mentioned, the hollow, cup-like platinum shell, conforming to the configuration of the head portion of the electrodes, is fitted on the electrode. This shell is approximately five-thousandths of

2 an inch thick and the head portion of the electrode fits therein fairly tightly.

The electrode is then ready for the brazing operation which is done at about 2000° F. in a hydrogen atmosphere. This operation bonds the platinum shell to the copper-plated electrode, following which, the peripheral edge of the platinum shell is crimped over the shoulder of the head portion of the electrode. The electrode is then ready for assembly in the spark plug.

It is well known that erosion of spark plug electrodes is due to the high temperatures to which the electrodes are subjected. If it is possible to lower the operating temperature of the head portion of an electrode, this will result in decreased erosion. A modification of the applicant's invention utilizes this known fact.

In this modification, the same low-carbon steel is machined to form the electrode. The spindle of the electrode is then hollowed out by a drilling operation, the drilled bore extending well down into the head of the electrode.

A copper plating operation then ensues, followed by the fitting of the platinum cap on the electrode head and the crimping of the edges of the cap over the shoulder of the head portion.

Solid portions of a metal having good thermal conductivity are then placed in the hollow of the electrode. The metal may be in powder form or in a cylindrical shape conforming to the hollowed spade of the electrode. It is preferable to use a metal having a melting temperature approximately the same as the brazing temperature of the copper plate. Silver has such a melting point.

The brazing of the platinum shell to the copper-plated electrode head and the melting and bonding of the silver filler to the copper plated inner walls of the hollowed-out space are then carried out in one heating operation.

The silver filler within the electrode spindle and head portion, together with the copper plating both on the outside and inside of the electrode, serve as excellent means for rapidly conducting heat away from the electrode head, thus reducing the tendency toward erosion at high temperatures.

These and other objects, features, and advantages of the invention will appear to those skilled in the art from the following description and accompanying drawing, wherein—

Fig. 1 is a view in elevation of a spark plug embodying the invention;

Fig. 2 is a vertical sectional view of the plug;

Fig. 3 is a vertical sectional view of the lower part of a central electrode illustrating the protective platinum layer brazed to the copperplating of the head portion; and Fig. 4 is a vertical sectional view of a modification of the invention illustrating the protection afforded to the head portion as well as the hollowed-out spindle filled with silver.

Referring to the drawing for more specific details of the invention, Fig. 2 shows a radioshielded spark plug of the type used in aircraft engines comprising a tubular metallic shell 10, having external threads 12 for cooperation with a threaded opening in an engine cylinder, not shown. The lower portion of the bore of said shell has walls which taper from the ends to a point intermediate the ends, the upper tapered surface 14 being provided to support a wedge-shaped sleeve 16 having an annular flange 18 adapted to seat on an internal shoulder of the metallic shell 10.

At the lower end of shell 10 there is suitably secured a ground electrode 20; while the upper end of said shell has an annular collar 22 providing space between said collar and the wedge-shaped sleeve 16 for reception of the lower end of a metallic shielding barrel 24 which has, adjacent its lower end, an internal flange 26 in pressing engagement with the top of the wedge-shaped sleeve 16. Collar 22 has an hexagonally shaped outside surface adapted for engagement with a wrench for securing the spark plug in a motor block.

The metallic shielding barrel 24 is tapered near the upper end thereof at 28, and said tapering effects a diametral reduction so that a terminal cap, not shown, may be secured to the upper end of the spark plug by external threads 30.

Within the metal barrel 24 and resting on the top of the internal flange 26 of said barrel is a stack of mica washers 32 supporting an insulating sleeve of ceramic material 34 which conforms to the shape of the inner wall of the metal barrel 24 and is in contact with said wall. At the upper end of insulator 34 is another stack of mica washers 36.

Insulator 34 provides in conjunction with the washers 32, the internal flange 26, and the wedge-shaped sleeve 16, a central circular bore 38 which receives the central electrode assembly.

The electrode assembly comprises a central electrode 40 mounted in an insulator 42 of suitable ceramic or other heat-resisting insulating material, said electrode having a head portion 44 of a cup-like shape in spark gap relation with the ground electrode 20, and a neck portion 46 of decreased diameter at the upper end thereof.

Insulator 42 has at its upper end a central bore 48 into which the neck portion 46 of the electrode protrudes, said bore being filled with a compressed filler 50 of aluminum and lead oxides through which a small wire 52 of a suitable conducting material, such as Nichrome, connects the neck portion 46 of the electrode to a pointed end 54 of a terminal 56 having a circular flange 58 on the upper end thereof for the support of the terminal on the upper end of insulator 42. The pointed end 54 of the terminal provides for insertion of said terminal in the compressed filler 50.

Between the insulator 34 and the insulator 42 is a suitable insulating compound 60, such as polymerized cashew nutshell oil.

Fig. 3 illustrates the applicant's invention, while Fig. 4 shows a modification of the invention.

In Fig. 3 a central electrode machined from a low-carbon free-machining steel has a head portion 44 and a spindle portion 46, said electrode being coated with a thin copper coating 62. A platinum cap 64 conforming to the shape of the electrode head portion is brazed to the copper coating of the head portion and the rim 66 of the platinum shell is crimped over a shoulder 68 of the electrode head portion.

A modification of the invention appears in Fig. 4 wherein 110 is a low-carbon steel head portion of a central electrode and 112 is the steel spindle portion of said electrode which has been hollowed out. A thin copper-plating 114 of approximately one thousandths of an inch is deposited on the exposed surface area of the electrode including the hollowed out portion of the spindle. A metal 116, such as silver, having a melting point approximately the same as the brazing temperature of copper is placed in powdered form or other suitable solid form within the hollow spindle. A platinum cap 118 is then fitted over the electrode head portion and its rim is crimped over the shoulder of the electrode head portion as at 120. The electrode is then placed in a brazing furnace and heated to a temperature of approximately 2000° F. in a hydrogen atmosphere. This results in brazing the platinum cap 118 to the head of the electrode, and at the same time the metal filler 116 is melted so as to completely fill the hollow portion of the electrode. Upon cooling, the metal filler becomes bonded to the copper layer of the hollow within the electrode.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A spark plug central electrode comprising head and spindle of low-carbon steel, a copper coating on the electrode, and a shell of heat resistant metal brazed on the head.

2. A spark plug central electrode comprising an enlarged head and spindle of low-carbon steel, a thin coating of copper over the electrode surface and a shell of platinum brazed on the head with the edges of said shell crimped over the enlarged electrode head.

3. A spark plug central electrode comprising a head and spindle of low-carbon free-machining steel having an axial bore through the spindle and extended into the head, a thin copper coating on the exposed surfaces of the electrode, a metal filler in the axial bore, and a thin shell of platinum on the head.

4. A spark plug central electrode comprising a head and spindle of low-carbon steel having an axial bore through the spindle and extended into the head, a thin layer of copper covering the electrode surfaces, a silver filler in the axial bore to conduct heat rapidly from the head, and a shell of platinum brazed on the head.

5. A spark plug central electrode comprising an enlarged head, a spindle connected thereto and having an axial bore extended into the head, a thin copper coating on the electrode surfaces, a highly conductive metallic filler in the axial bore to dissipate rapidly the heat incident to sparking, and a shell of heat resistant metal brazed on the head.

6. A spark plug central electrode comprising an enlarged head, a spindle connected thereto and having an axial bore extended into the head, a thin copper coating on the electrode surface, a highly conductive metallic filler in the axial bore to dissipate rapidly the heat incident to sparking, and a shell of heat resistant material brazed on the enlarged head and crimped over at the upper edge.

7. A spark plug central electrode comprising an enlarged head, a spindle connected thereto and having an axial bore extended into the head, a thin copper coating on the electrode surface, a silver filler in the axial bore to dissipate the heat generated in the head, and a platinum shell fitted over and brazed on the head.

8. A spark plug central electrode comprising an enlarged head, a spindle connected thereto having an axial bore extended into the head, a thin copper coating on the electrode surfaces, a silver filler brazed to the walls defining the axial bore, and a platinum shell brazed on the enlarged head and crimped over the upper edge thereof.

9. A spark plug central electrode comprising an enlarged head having an annular groove around the upper edge thereof, a spindle connected to the upper end of the head having an axial bore extended into the head, a thin copper coating on the electrode surfaces, a highly conductive metallic filler in the axial bore, and a shell of heat resistant metal brazed on the head and turned down into the annular groove.

10. A spark plug central electrode comprising an enlarged head having an annular groove around the upper edge thereof, a spindle connected to the upper end of the head having an axial bore extended into the head, a thin copper coating on the electrode surfaces, a silver filler in the axial bore and a platinum shell brazed on the head and turned down into the annular groove.

FELIX B. LITTON.

REFERENCES CITED

The following references are of record in the file of this patent:

UNITED STATES PATENTS

| Number | Name | Date |
| --- | --- | --- |
| 2,150,725 | Nowosielski | Mar. 14, 1939 |
| 2,162,062 | Corbin | June 13, 1939 |
| 1,506,971 | Bundy | Sept. 2, 1924 |
| 1,762,989 | Hurley | June 10, 1930 |
| 2,391,457 | Carlson | Dec. 25, 1945 |
| 2,391,458 | Hensel | Dec. 25, 1945 |
| 2,391,459 | Hensel | Dec. 25, 1945 |

FOREIGN PATENTS

| Number | Country | Date |
| --- | --- | --- |
| 163,786 | British | May 24, 1921 |
| 4,667 | British | Feb. 26, 1907 |